United States Patent [19]

Yokota et al.

[11] Patent Number: 4,855,147

[45] Date of Patent: Aug. 8, 1989

[54] BEVERAGES BY LACTIC ACID FERMENTATION AND METHODS OF PRODUCING SAME

[75] Inventors: Tetsuya Yokota; Hideki Sakamoto; Naoto Takahashi, all of Tochigi, Japan

[73] Assignee: Kagome Kabushiki Kaisha, Nagoya, Japan

[21] Appl. No.: 182,412

[22] Filed: Apr. 18, 1988

[30] Foreign Application Priority Data

Sep. 17, 1987 [JP] Japan .................................. 62-233470
Sep. 17, 1987 [JP] Japan .................................. 62-233471

[51] Int. Cl.$^4$ ...................... A23C 9/127; A23C 9/133; A23L 2/02
[52] U.S. Cl. .......................................... 426/43; 426/51; 426/52; 426/61; 426/580; 426/599; 426/590
[58] Field of Search ................... 426/7, 42, 51, 43, 52, 426/590, 63, 61, 599, 580, 588

[56] References Cited

U.S. PATENT DOCUMENTS

| | | | |
|---|---|---|---|
| 1,174,248 | 3/1916 | Frerichs | 426/51 |
| 3,891,771 | 6/1975 | Green et al. | 426/52 |

FOREIGN PATENT DOCUMENTS 0027356  2/1985  Japan ..................................... 426/51

*Primary Examiner*—Marianne Cintins
*Attorney, Agent, or Firm*—Flehr, Hohbach, Test, Albritton & Herbert

[57] ABSTRACT

Beverages are produced by adding *Lactobacillus bulgaricus* and/or *lactobacillus helveticus* to a processed tomato product in admixture with a milk product for lactic acid fermentation, or by adding such bacterial cells and *Streptococcus thermophilus* to a processed tomato product in admixture with a milk product with its pH adjusted within a specified range.

15 Claims, 1 Drawing Sheet

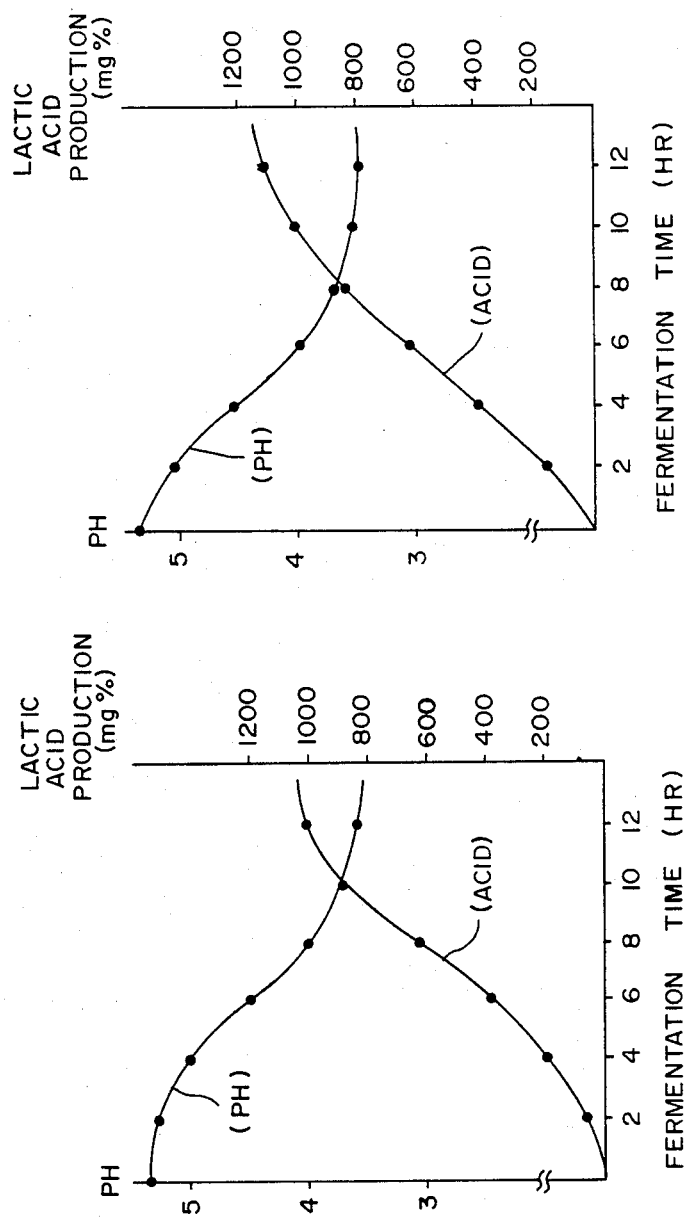
FIG.—2
FIG.—1

BEVERAGES BY LACTIC ACID FERMENTATION AND METHODS OF PRODUCING SAME

BACKGROUND OF THE INVENTION

This invention relates to beverages by lactic acid fermentation and methods of producing the same.

Tomatoes contain various minerals and vitamins but the juice squeezed from them has a peculiar unripe flavor which can be repulsive to people who want to drink it. It is therefore desirable to provide a beverage which contains the minerals and vitamins of the tomato but of which the flavor has been improved. This invention responds to this demand and relates to tomato drinks by lactic acid fermentation and methods of producing such beverages.

Examples of prior art tomato drinks by lactic acid fermentation with improved flavor include one obtained by lactic acid fermentation of tomato juice neutralized with sodium hydroxide of the pH value of about 7 (Japanese Patent Publication Tokko No. 42-1469) and another by lactic acid fermentation of tomato juice with *Lactobacillus brevis* at 15°-30° C. for 1-3 days (Japanese Patent Publication Tokkai No. 57-138370). Although these beverages by lactic acid fermentation have the advantage of having compounded a secondary flavor by lactic acid fermentation, the so-called "off flavor" is generated during such lactic acid fermentation using *Lactobacillus acidophilus* or *Lactobacillus brevis* as disclosed and such "off flavor" can be equally repulsive although different from the unripe flavor of the tomato.

SUMMARY OF THE INVENTION

The present invention provides improved tomato drinks by lactic acid fermentation and methods of their production with which the problem described above can be overcome. The present invention was completed by the present inventors as a result of diligent efforts from the point of view described above and is based on the discovery that an improved drink of a desirable kind with a compound but unified flavor can be obtained if *Lactobacillus bulgaricus* and/or *Lactobacillus helveticus* which is extremely closely related to it, out of the many hitherto well-known lactobacilli, are added either singly or together to a processed tomato product or preferably to a mixture of a processed tomato product and a milk product for lactic acid fermentation and, more preferably, if these *Lactobacilli* and *Streptococcus thermophilus* are added for lactic acid fermentation to a processed tomato product or preferably to a mixture of a processed tomato product and a milk product which has been prepared to a specific pH range.

BRIEF DESCRIPTION OF THE DRAWINGS

The accompanying drawings, which are incorporated in and form a part of the specification, show exemplary processes of lactic acid fermentation embodying the present invention and, together with the description, serve to explain the principles of the invention.

FIG. 1 shows the process of fermentation when a mixture of 50 weight parts of tomato puree (sugar content of 9%) and 50 weight parts of a milk product (12 wt % water solution of skimmilk powder) was adjusted to pH=5.3 and after this mixture was heated to 110° C. for sterilization and then cooled to 40° C., *Lactobacillus bulgaricus* which has been separately and preliminarily prepared was added at the rate of $10^6$–$10^7$ ml and it was left quietly at 40° C.

FIG. 2 shows the process of fermentation when, after 50 weight parts of tomato puree (sugar content of 9%) and 50 weight parts of a milk product (12 wt. % water solution of skim milk powder) were separately heated to 120° C. for sterilization and cooled to 40° C., they were mixed together and adjusted to pH=5.3 and after *Lactobacillus bulgaricus* and *Streptococcus thermophilus* which had been separately and preliminarily prepared were added individually at the rate of $10^6$–$10^7$/ml, it was left quietly at 40° C. Both FIGS. 1 and 2 show that a fermentation process is proceeding normally.

DETAILED DESCRIPTION OF THE INVENTION

In summary, the present invention relates firstly to beverages by lactic acid fermentation having as their principal component a fermented liquid of a processed tomato product by *Lactobacillus bulgaricus* and/or *Lactobacillus helveticus* or a concentrate thereof, secondly to beverages by lactic acid fermentation having as their principal component a fermented liquid of a mixture of a processed tomato product and a milk product by *Lactobacillus bulgaricus* and/or *Lactobacillus helveticus* or a concentrate thereof, thirdly to a method of producing a beverage by lactic acid fermentation comprising the steps of sterilizing and cooling a processed tomato product obtained by crushing and squeezing tomatoes, thereafter adding thereto preliminarily prepared *Lactobacillus bulgaricus* and/or *Lactobacillus helveticus* thereto, fourthly, to a method of producing a beverage by lactic acid fermentation characterized by the step of adding preliminarily prepared *Lactobacillus bulgaricus* and/or *Lactobacillus helveticus* and *Streptococcus thermophilus* for lactic acid fermentation to a processed tomato product which has been sterilized, cooled and adjusted to pH=4.4–5.3 and fifthly to a method of producing a beverage by lactic acid fermentation characterized by the step of adding preliminarily prepared *Lactobacillus bulgaricus* and/or *Lactobacillus helveticus* and *Streptococcus thermophilus* for lactic acid fermentation to a mixture of a processed tomato product and a milk product which has been sterilized, cooled and adjusted to pH=4.4–5.3.

Processed tomato products used in this invention include juice, purees and pastes obtained from uncooked tomatoes by an appropriate combination of washing, selecting, crushing, squeezing, and concentrating steps. The milk products to be used in combination with a tomato product according to the present invention include animal milk such as cow milk and goat milk and vegetable milk such as soybean milk but skimmilk powder is preferable from the point of view of processability as well as the flavor of the fermented liquid and its uniformity. It is preferable to use such a milk product inclusive of skimmilk powder at the rate less than 10 wt % (in terms of solid component) with reference to the tomato product. If a higher ratio of milk product is used, balance is lost in the flavor of the produced fermented liquid.

Prior to lactic acid fermentation, the tomato products and the mixtures of tomato and milk products considered above are heated up to 100°–121° C., for example, for sterilization and then cooled in an aqueous sytem of which the concentration, the pH value and sugar content are appropriately prepared. When a mixture is heated for sterilization, however, solidification of protein may take place at the time of sterilization, depending on the pH value of the aqueous system. Such solidified substances may be removed after lactic acid fermentation but it is preferable to prevent such solidification by heating the processed tomato product and the milk product separately for sterilization and, after they are cooled, mixing them together for the purpose of lactic acid fermentation.

The processed tomato product or the mixture which has been sterilized and cooled as explained above is used for lactic acid fermentation according to the present invention with *Lactobacillus bulgaricus* and/or *Lactobacillus helveticus* or with these lactobacilli and *Streptococcus thermophilus* used therefor. It is only by using at least *Lactobacillus bulgaricus* and/or *Lactobacillus helveticus* that generation of so-called "off flavor" can be controlled during the lactic acid fermentation of a processed tomato product or its mixture and hence that beverages with a compound but unified flavor can be obtained efficiently. Such a beverage cannot be obtained by using *Lactobacillus acidophilus* or *Lactobacillus brevis*. When *Streptococcus thermophilus* is used together, the pH of the processed tomato product or its mixture in an aqueous form is adjusted to 4.4–5.3 or preferably to 4.7–5.1 either before or after they are sterilized and cooled but at least before the step of lactic acid fermentation. If the pH value is smaller than 4.4, lactic acid fermentation does not proceed efficiently. If it is larger than 5.3, on the other hand, generation of an off flavor mainly by *Streptococcus therophilus* cannot be avoided. If lactic acid fermentation is carried out by adding *Lactobacillus bulgaricus* and/or *Lactobacillus helveticus* and *Streptococcus thermophilus* together in the aforementioned pH region, fermentation of a processed tomato product or its mixture can be efficiently carried out, generation of the so-called off flavor can be controlled during the lactic acid fermentation and a pleasant drink with a compound but unified flavor can be obtained by such lactic acid fermentation.

More in detail, the lactic acid fermentation process, if *Streptococcus thermophilus* is also to be used, is carried out by adding separately and preliminarily prepared *Lactobacillus bulgaricus* and/or *Lactobacillus helveticus* and *Streptococcus thermophilus* individually at a rate of about $10^6$–$10^7$/ml into an aqueous processed tomato product or its mixture which has been sterilized, cooled and adjusted as to its pH value as described above and by preventing contamination from outside. It is preferable that lactic acid fermentation be carried out at 30°–45° C. for 4–20 hours. If the fermentation temperature is too low, it takes too long to complete the fermentation while, if the fermentation temperature is too high, the flavor of the fermented liquid is adversely affected.

Each fermented liquid thus obtained may be directly used as product because the bacterial cells contained in it are themselves useful but they may be removed by filtration or centrifugal separation. The produced liquid may be sold as a chilled product or in ordinary cans or bottles. If necessary, it may be concentrated or further processed. It can also be dired but it is not preferable because the quality is adversely affected and measures must be taken against hygroscopicity. If desired, sugar compounds and flavors may be added at the fianl stage and the liquid may also be carbonated.

Each product thus prepared makes use of minerals and vitamins contained in the processed tomato products and the milk product which may be added thereto and has a pleasant compound but unified flavor. In fact, a comparison test was conducted with products using *Lactobacillus acidophilus* or *Lactobacillus brevis* by 20 testers repeating three times the so-called 2-or-3 point method of testing whereby two or three items including test and comparison samples are evaluated and numbers indicative of the tester's order of preference are assigned. Favorable evaluation of beverages by lactic acid fermentation according to the present invention was established by a margin of 1%.

EXAMPLE 1

Tomato juice with the sugar content 5.4% (obtained by washing and selecting uncooked tomatoes and, after crushing with a crusher, by squeezing with a pulper with a filter net of 2 mm$\phi$) was prepared to pH=5.2, heated to 110° C. for sterilization and then cooled to 35° C. Next, *Lactobacillus bulgaricus* which was separately and preliminarily prepared was added to it at the rate of $3\times10^6$/ml and the mixture was left quietly at 35° C. for 18 hours for fermentation. The pH value of the fermented liquid thus obtained was 3.9 and 500 mg % of lactic acid was generated. A beverage of a desired kind was obtained by mixing 99 liters of this fermented liquid with 100 g of sugar and 0.5 g of flavor (lemon-type).

EXAMPLE 2

A mixture of 50 weight parts of tomato puree with sugar content of 9.0% (obtained by vacuum concentration of tomato juice obtained similarly as in Example 1) and 50 weight parts of a milk product (12 wt % water solution of skimmilk powder) was prepared to pH=5.3, heated to 110° C. for sterilization and then cooled to 40° C. Next, *Lactobacillus bulgaricus* which was separately and preliminarily prepared was added to it at the rate of $5\times10^6$/ml and the mixture was left quietly at 40° C. for 8 hours for fermentation. The pH value of the fermented liquid thus obtained was 3.9 and 100 mg % of lactic acid was generated. This liquid was centrifugally separated and a beverage of a desired kind was obtained by mixing 50 liters of this separated liquid, 49 liters of water, 120 g of sugar and 0.5 g of a flavor material (citrous).

EXAMPLE 3

Tomato juice with the sugar content 4.5% (obtained by washing and selecting uncooked tomatoes and, after crushing with a crusher, by squeezing with a pulper with a filter net of 2 mm$\phi$) was prepared to pH=5.0, heated to 110° C. for sterilization and then cooled to 35° C. Next, *Lactobacillus bulgaricus* and *Streptococcus thermophilus* which were separately and preliminarily prepared were added to it individually at the rate of $3\times10^6$/ml and the mixture was left quietly at 35° C. for 18 hours for fermentation. The pH value of the fermented liquid thus obtained was 3.9 and 500 mg % of lactic acid was generated. A beverage of a desired kind was obtained by mixing 99 liters of this fermented liquid with 100 g of sugar and 0.5 g of flavor (lemon-type).

EXAMPLE 4

After 50 weight parts of tomato puree with sugar content of 9.0% (obtained by vacuum concentration of tomato juice obtained similarly as in Example 1) and 50 weight parts of a milk product (12 wt. % water solution of skimmilk powder) were separately heated to 110° C. for sterilization and cooled to 40° C., they were mixed together and adjusted to pH=5.3. Next, *Lactobacillus bulgaricus* and *Streptococcus thermophilus* which were separately and preliminarily prepared were added to it individually at the rate of $5 \times 10^6$/ml and the mixture was left quietly at 40° C. for eight hours for fermentation. The pH value of the fermented liquid thus obtained was 3.9 and 100 mg % of lactic acid was generated. This liquid was centrifugally separated and a beverage of a desired kind was obtained by mixing 50 liters of this separated liquid, 49 liters of water, 120 g of sugar and 0.5 g of a flavor material (citrous).

As explained above, the present invention has the effect of making use of minerals and vitamins contained in tomatoes while removing its own repulsive flavor and providing pleasant beverages by lactic acid fermentation without the so-called "off flavor" but having a new compound but unified flavor.

We claim:

1. A beverage by lactic acid fermentation comprising as a principal component thereof a fermented liquid obtained by lactic acid fermentation of a mixture of a processed tomato juice product or a concentrate thereof and a milk product by *Lactobacillus bulgaricus*.

2. The beverage of claim 1 wherein said fermented liquid contains bacterial cells.

3. The beverage of claim 1 wherein said milk product contains less than 10 wt % as solid skim milk component with respect to said processed tomato juice product.

4. The beverage of claim 2 wherein said milk product contains less than 10 wt % as solid skimmilk component with respect to said processed tomato juice product.

5. The beverage of claim 3 wherein said milk product comprises skimmilk powder.

6. The beverage of claim 4 wherein said milk product comprises skimmilk powder.

7. The beverage of claim 1 wherein said mixture is obtained by sterilizing and cooling said processed tomato product and said milk product separately and then mixing said processed tomato and milk products together.

8. A method of producing a beverage by lactic acid fermentation, said method comprising the steps of sterilizing and cooling a mixture of a processed tomato juice product obtained (by crushing and squeezing tomatoes or a concentrate of said product and a milk product, adjusting said mixture to pH 4.4–5.3, and adding precultured *Lactobacillus bulgaricus* to said adjusted mixture for lactic acid fermentation at 35°–45° C. for 4–12 hours.

9. The method of claim 8 wherein said milk product contains less than 10 wt % as solid skimmilk component with respect to said processed tomato juice product.

10. The method of claim 9 wherein said milk product comprises skimmilk powder.

11. The method of claim 8 wherein said mixture is obtained by sterilizing and cooling said processed tomato juice product and said milk product separately and then mixing said processed tomato juice and milk products together.

12. A method of producing a beverage by lactic acid fermentation, said method comprising the steps of sterilizing and cooling a mixture of a processed tomato juice product and cooling a mixture of a processed tomato juice product obtained by crushing and squeezing tomatoes or a concentrate of said product and a milk product, adjusting said mixture to pH 4.4–5.3, and adding separately precultured *Lactobacillus bulgaricus* and *Streptococcus thermophilus* to said adjusted mixture for lactic acid fermentation at 35°–45° C. for 4–12 hours.

13. The method of claim 12 wherein said milk product contains less than 10 wt % as solid skimmilk component with respect to said processed tomato juice product.

14. The method of claim 3 wherein said milk product comprises skimmilk powder.

15. The method of claim 12 wherein said mixture is obtained by sterilizing and cooling said processed tomato juice product and said milk product separately and then mixing said processed tomato juice and milk products together.

* * * * *

UNITED STATES PATENT AND TRADEMARK OFFICE
CERTIFICATE OF CORRECTION

PATENT NO. : 4,855,147
DATED : August 8, 1989
INVENTOR(S) : Yokota et al

It is certified that error appears in the above-identified patent and that said Letters Patent is hereby corrected as shown below:

Claim 12, line 22, delete "and cooling a mixture of a processed tomato juice product".

Signed and Sealed this

Twenty-third Day of October, 1990

Attest:

HARRY F. MANBECK, JR.

*Attesting Officer*  *Commissioner of Patents and Trademarks*